May 26, 1925.
W. M. PHELPS
LIQUID LEVEL INDICATOR
Filed April 21, 1922
1,539,407
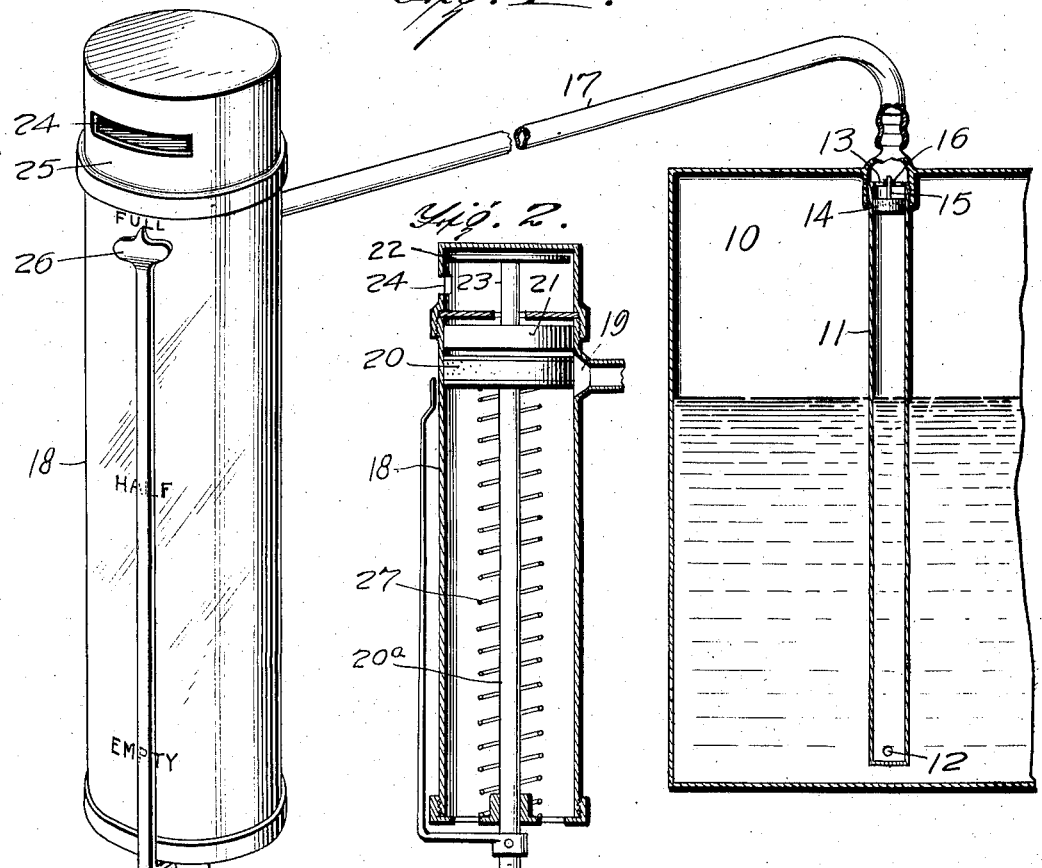
Inventor
W. M. PHELPS,
By
Attorney Patented May 26, 1925.

1,539,407

UNITED STATES PATENT OFFICE.

WILBUR M. PHELPS, OF STAUNTON, VIRGINIA.

LIQUID-LEVEL INDICATOR.

Application filed April 21, 1922. Serial No. 555,847.

*To all whom it may concern:*

Be it known that I, WILBUR M. PHELPS, residing at Staunton, county of Augusta, and State of Virginia, a citizen of the United States, have invented certain new and useful Improvements in Liquid-Level Indicators, of which the following is a specification.

My invention relates to indicators or gages for showing the levels of liquids in tanks that are more or less removed from the gage or indicator, and in particular to such devices for showing the level, and therefore the quantity, of gasoline or other fuel in the storage tanks of automobiles, and since my invention has especial reference to this particular use, I shall illustrate and describe its embodiment in connection with an automobile. My object is to provide apparatus for the purpose stated which is simple of construction and therefore inexpensive to make, which will be accurate, and therefore its indications can be relied upon, which will call for or require little effort or trouble in such manipulation as may be necessary, and which, having reference to automobile use, can be installed upon the instrument board of the car without being in the way or interfering with other appliances usually mounted upon the instrument board of a car. My invention consists in whatever is described by or included within the meaning or scope of the appended claims.

In the accompanying drawings:

Fig. 1 is a view illustrating an embodiment of my invention for automobile use, that portion of the instrument which is mounted upon the instrument board of the car being shown in perspective, and the gasoline tank in vertical section;

Fig. 2 is a vertical section through the indicator device;

Fig. 3 is a similar view of another embodiment of my invention; and

Fig. 4 is a front elevation thereof.

Briefly described, my invention comprises a pipe or chamber in the gas tank, or reservoir, having an outlet at the top which may be closed by a float that is lifted to close it by the ascent of gasoline in the pipe, and a pump or suction device located for convenient operation and inspection,—say on the instrument board of the car—by which the gasoline, if at a level below the float, may be raised, and an indicator or signal device which will denote or tell, that the gasoline has reached the level in the pipe that will cause the float to close the pipe outlet, at which instant the pump or suction device must be stopped, for then, an index actuated by the pump will be in a position that will show what was the level of gasoline in the tank before the movement of the pump began. My invention may be embodied in various forms, and merely for illustration, I show several in the drawings without thereby restricting myself to only those shown.

Referring first to what is shown in Figs. 1 and 2, the gasoline tank 10 has within it a vertical pipe 11, with a small aperture 12 at the bottom which establishes communication between the interior of the tank and the interior of the pipe, and with an outlet 13 at the top adapted to be closed by a float valve 14, in the upper part of the pipe, which has a stem 15, which by a cross pin or spider 16 on the outside of the pipe end, prevents the valve falling beyond a limited extent, when the gasoline recedes from it. From the outlet end of the pipe 11, a pipe 17 (which may be flexible tubing) runs to the instrument board of the car, and is connected with the interior of a pump cylinder 18, near the top thereof, the cylinder having in its side a vertically elongated opening or slit 19, through which communication is had between cylinder and pipe 17. The slit or port 19 is situated so that when the pump piston 20 is at the upper end of its movement, the piston will be opposite said port, at which time it forms a passage for air below the piston, so that, as the cylinder is open at the bottom, the pipe 17 and the interior of the gasoline tank are in free communication with the external air.

When the piston descends far enough to cut off the pipe 17 from communication with the outside air, the further descent of the piston will suck air from gas tank pipe 11, and cause the ascent into the pipe of gasoline, if its level is below the outlet 13 of such pipe, and such ascent will continue until the float valve 14 lifts and closes the outlet 13. In the pump cylinder, above the pump piston, is a disk 21, which, when the float valve 14 closes the outlet 13, is acted on by the descending pump piston, and moved downward, and such disk, after but a short movement, is caused to actuate a signal which may be a thin disk 22, connected by a stem 23 to the disk 21, that by the downward movement of the disk, is brought opposite a sight opening 24 in the casing 25, that forms an extension of the pump cylinder. Sufficient friction between the sides of the piston 21 and the bore of the cylinder 18 exists to prevent gravity lowering the piston 21 and disk 22, and the suction of the piston 20 is not sufficient to lower piston 21 until the valve, 14, is seated by the ascent of liquid in pipe, 11, the suction sufficient to raise the liquid when the piston 20 descends not being enough to lower the piston, 21. The instant the signal is exhibited, the descent of the pump piston is stopped, and as an index 25 is attached to the piston rod 26, so as to coact with words or numerals on the exterior of the cylinder, at different levels, it is at once indicated what is the level of the gasoline in the tank 10.

The reading having been noted, the pump piston is raised to its former level, to uncover the port 19, to allow free air communication between the external air and the gas tank, and thereby, the signal actuating disk 21 is restored to its former position, and rendering the signal invisible or non-indicating. The piston 21 and the disk 22 are lifted either by the contact of piston 20 with piston 21 or the air pressure against piston 21, or both. A coil spring 27 may be employed to lift the pump piston.

Referring to Figs. 3 and 4, the signal is an electric lamp 28, mounted on the instrument board 29, which is in a circuit that includes two fixed contacts 30 that are bridged by a disk 31 of conducting material which is connected by a stem 32 to the disk 33, corresponding to disk 21 in Fig. 2, which is moved in a similar way by the pump piston 34.

In Figs. 3 and 4 the level indicator is a rotating hand or pointer 35, and a dial 36, the hand being movable through 180 degrees in correspondence with the movement of the pump piston 34, by means of a wheel 37 that is connected by a cord or wire 38 with an arm 39, on the piston rod 40, a spring 41 moving the wheel in the reverse direction.

In practice, the cubic capacity of the tank pipe 11 may, in proportion to that of the pump cylinder, be such that about three inches of length of the latter will equal about nine inches of length of pipe 11.

I claim:

1. A liquid level indicator comprising a chamber adapted to communicate at its lower end with a liquid surrounding said end at the full depth to be measured, a suction device in communication with the upper end of such chamber and having a movable member that when actuated causes the ascent of liquid in such chamber, means to prevent the ascent of liquid in such chamber above a predetermined level, and means operatively associated with the suction device that shows the extent of movement of the moving member thereof required to produce the ascent of the liquid to the predetermined level.

2. A liquid level indicator comprising a chamber adapted to communicate at its lower end with the liquid the level of which is to be determined, said end being at the full depth to be measured, said chamber having an outlet above the liquid level therein, a pump, having a reciprocating piston, in communication with said outlet, the piston when moved in one direction acting to cause the ascent of liquid in the chamber, means to limit such ascent to a predetermined level, and an index operatively associated with the pump piston that shows the extent of movement of the piston to cause the ascent of liquid in the chamber to the predetermined level.

3. A liquid level indicator comprising a chamber adapted to communicate at its lower end with the liquid the level of which is to be determined, said end being at the full depth to be measured, a suction device in communication with said chamber above the normal liquid level therein having a movable member that when actuated causes the ascent of liquid in said chamber, means to prevent the ascent of liquid in said chamber above a predetermined level, means operatively associated with the suction device that shows the extent of movement of the moving member thereof required to produce the ascent of the liquid to the predetermined level, and a signal and means to cause such signal to function after such predetermined level of the liquid has been reached.

4. A liquid level indicator comprising a chamber in the liquid whose level is to be ascertained having an inlet for liquid below the full depth to be measured, and having an outlet, a liquid-operated device for closing said outlet at a predetermined liquid level, a pump in communication with such chamber through said outlet for raising liquid within the chamber to actuate said outlet-closing device, a signal, and means to operate the signal by the continued operation of the pump after the closing of said outlet.

5. A liquid level gage for a liquid container comprising a pipe projecting into the container through the top of said container, said pipe having its lower end adjacent the bottom of said container and adapted to receive liquid from the container, a float valve in the top end of said pipe, means for displacing the air in said pipe above the liquid level to thereby draw liquid into said pipe to cause the closing of said valve, and means controlled by said displacing means for producing an indication proportional to the amount of air displaced.

6. A liquid level gage for a liquid container comprising a pipe projecting into the container through the top of said container, said pipe having its lower end adjacent the bottom of said container and adapted to receive liquid from the container, a float valve in the top end of said pipe, means for displacing the air in said pipe above the normal liquid level to thereby draw liquid into said pipe to cause the closing of said valve and means controlled by said displacing means for producing an indication proportional to the amount of air displaced, said means comprising an expansible chamber having a connection with said pipe, and resilient means for normally maintaining said expansible chamber contracted.

In testimony whereof I hereunto affix my signature.

WILBUR M. PHELPS.